(12) United States Patent
Alexin et al.

(10) Patent No.: US 8,702,367 B2
(45) Date of Patent: Apr. 22, 2014

(54) METHOD, AND PROCESS FOR PREPARING A RECYCLABLE MATERIAL

(75) Inventors: Barry J. Alexin, Monroe, MI (US);
Thomas A. Smith, Westland, MI (US);
Scot A. Bowman, Magnolia, OH (US);
Charles J. Knott, Magnolia, OH (US);
Thomas G. Webb, Massillon, OH (US)

(73) Assignee: Edw. C. Levy Co., Detroit, MI (US)

( * ) Notice: Subject to any disclaimer, the term of this patent is extended or adjusted under 35 U.S.C. 154(b) by 2038 days.

(21) Appl. No.: 11/689,058

(22) Filed: Mar. 21, 2007

(65) Prior Publication Data
US 2008/0232423 A1 Sep. 25, 2008

(51) Int. Cl.
B65F 3/00 (2006.01)
(52) U.S. Cl.
USPC .......................... 414/511; 414/509; 414/512
(58) Field of Classification Search
USPC .......... 414/511, 509, 512, 513, 516, 517, 519
See application file for complete search history.

(56) References Cited

U.S. PATENT DOCUMENTS

| 3,799,374 | A |   | 3/1974  | Weaver          |        |
|-----------|---|---|---------|-----------------|--------|
| 3,953,170 | A |   | 4/1976  | Webb            |        |
| 3,979,205 | A |   | 9/1976  | Wanzenberg      |        |
| 3,985,545 | A |   | 10/1976 | Kinoshita et al.|        |
| 4,011,957 | A |   | 3/1977  | Bendtsen        |        |
| 4,197,049 | A |   | 4/1980  | Stedman et al.  |        |
| 4,373,435 | A | * | 2/1983  | Grevich         | 100/49 |
| 5,035,563 | A | * | 7/1991  | Mezey           | 414/409 |
| 5,352,084 | A | * | 10/1994 | Hodgins         | 414/517 |
| 5,421,689 | A | * | 6/1995  | Boivin          | 414/409 |
| 5,664,492 | A | * | 9/1997  | Bendzick        | 100/45 |
| 5,885,049 | A |   | 3/1999  | McNeilus et al. |        |
| 6,062,804 | A |   | 5/2000  | Young et al.    |        |
| 6,079,933 | A |   | 6/2000  | Moyna et al.    |        |
| 6,092,973 | A |   | 7/2000  | Burnett et al.  |        |
| 6,102,644 | A |   | 8/2000  | Young et al.    |        |
| 6,155,776 | A |   | 12/2000 | Moyna           |        |
| 6,176,673 | B1|   | 1/2001  | Moyna et al.    |        |
| 6,238,167 | B1|   | 5/2001  | Kenny et al.    |        |
| 6,801,563 | B2| * | 10/2004 | Stercho         | 373/79 |

(Continued)

FOREIGN PATENT DOCUMENTS

| EP | 65249 A1 | 11/1982 |
| JP | 07225013 | 8/1995  |
| JP | 11010117 | 1/1999  |

OTHER PUBLICATIONS

Examiner's Report from the Australian Patent Office dated Aug. 14, 2009 for Application 2008201251.

(Continued)

Primary Examiner — Saul Rodriguez
Assistant Examiner — Brendan Tighe
(74) Attorney, Agent, or Firm — Honigman Miller Schwartz and Cohn LLP

(57) ABSTRACT

A method for preparing material comprising the steps of providing a transport vehicle including a horizontal ejector and a basin that defines an opening, wherein the horizontal ejector is coupled to the material within the basin; loading a first material into the basin proximate the horizontal ejector; loading a second material into the basin proximate the opening; actuating the horizontal ejector for movement from a retracted position toward a deployed position; and horizontally ejecting the second material through the opening and then subsequently horizontally ejecting the first material through the opening. A system is also disclosed.

7 Claims, 5 Drawing Sheets

(56) References Cited

U.S. PATENT DOCUMENTS

| | | | |
|---|---|---|---|
| 7,497,985 B2* | 3/2009 | Fuchs | 266/177 |
| 2003/0223849 A1 | 12/2003 | Hagenbuch | |
| 2004/0184904 A1* | 9/2004 | Tomassoni | 414/525.1 |
| 2004/0223838 A1* | 11/2004 | Daniel | 414/739 |
| 2005/0105993 A1 | 5/2005 | Hagenbuch | |
| 2008/0298941 A1 | 12/2008 | Hagenbuch et al. | |

OTHER PUBLICATIONS

Examiner's Report from the Australian Patent Office dated Jan. 6, 2010 for Application 2008201251.

Machine Translation of JP11010117A2.

Letter Dated May 17, 2011 from Leydig, Voit & Mayer to Joseph V. Coppola, Sr.

"Development of Efficient Cost-Effective Steel Scrap Haulage From the Steel Scrap Yard to the Charging Bucket for Electric Arc Furnace-Charge Bucket Loadings", authors: Josh J. Swank and LeRoy G. Hagenbuch.

Power Point Presentation by Tube City IMS "Scrap Yard Operations", Nucor Jewett Project (29 pages).

* cited by examiner

METHOD, AND PROCESS FOR PREPARING A RECYCLABLE MATERIAL

TECHNICAL FIELD

The invention relates in general to a method and system for preparing a recyclable material, and, in particular, to a method and system for preparing a recyclable material including metal.

BACKGROUND

Most manufacturing industries utilize one or more materials that are derived from one or more natural resources. As the demand for goods in emerging markets continues to grow throughout the world, the limited supply of natural resources drives up the cost of most materials that are derived from natural resources. Thus, there is a great demand for natural resources in the global marketplace, and, correspondingly, an increasing need to recycle material derived from natural resources, such as, for example, paper, plastic, metal, and the like. Handling and processing of recycled material can account for a large percentage of the cost of using recycled material. Accordingly, increased efficiencies associated with handling and processing of recycled material are directly reflected in the pricing of the products produced from the recycled materials.

Accordingly, there is a need in the art for a method and system for preparing a recyclable material.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a method, system, and process for preparing a recyclable material in accordance with an embodiment of the invention. Based on the foregoing, it is to be generally understood that the nomenclature used herein is simply for convenience and the terms used to describe the invention should be given the broadest meaning by one of ordinary skill in the art.

Figure 1A:
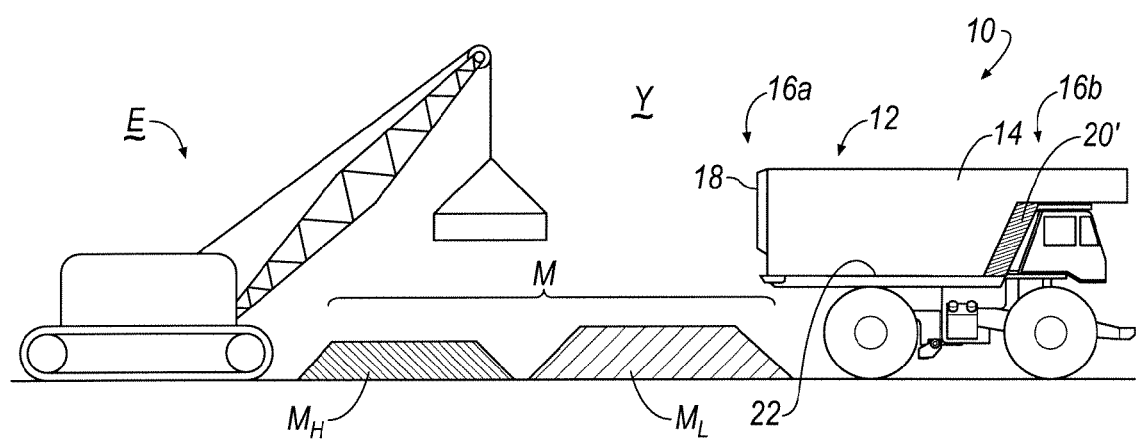
FIGS. 1A-1C illustrate a method, system, and process for preparing a recyclable material in accordance with an exemplary embodiment of the invention.
Figure 1B:
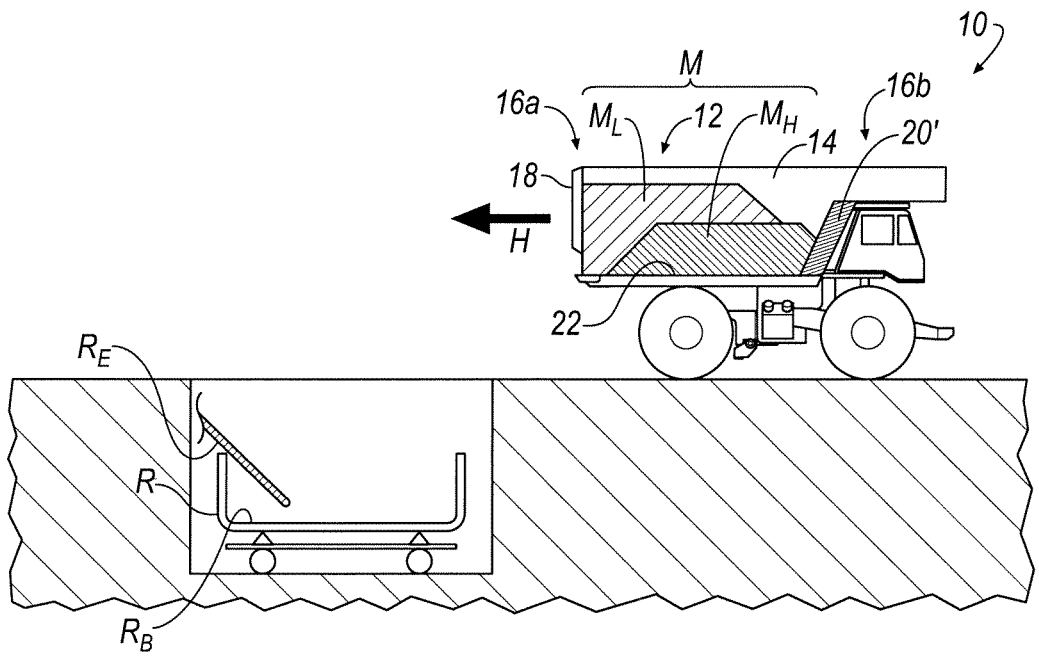
Figure 1C:
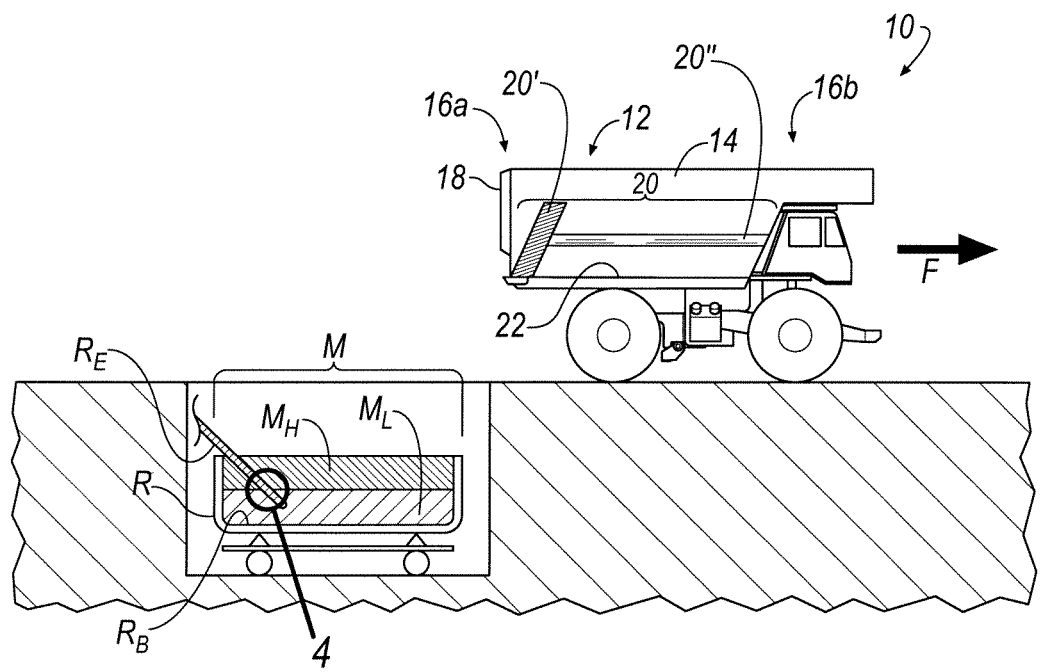
Figure 2:
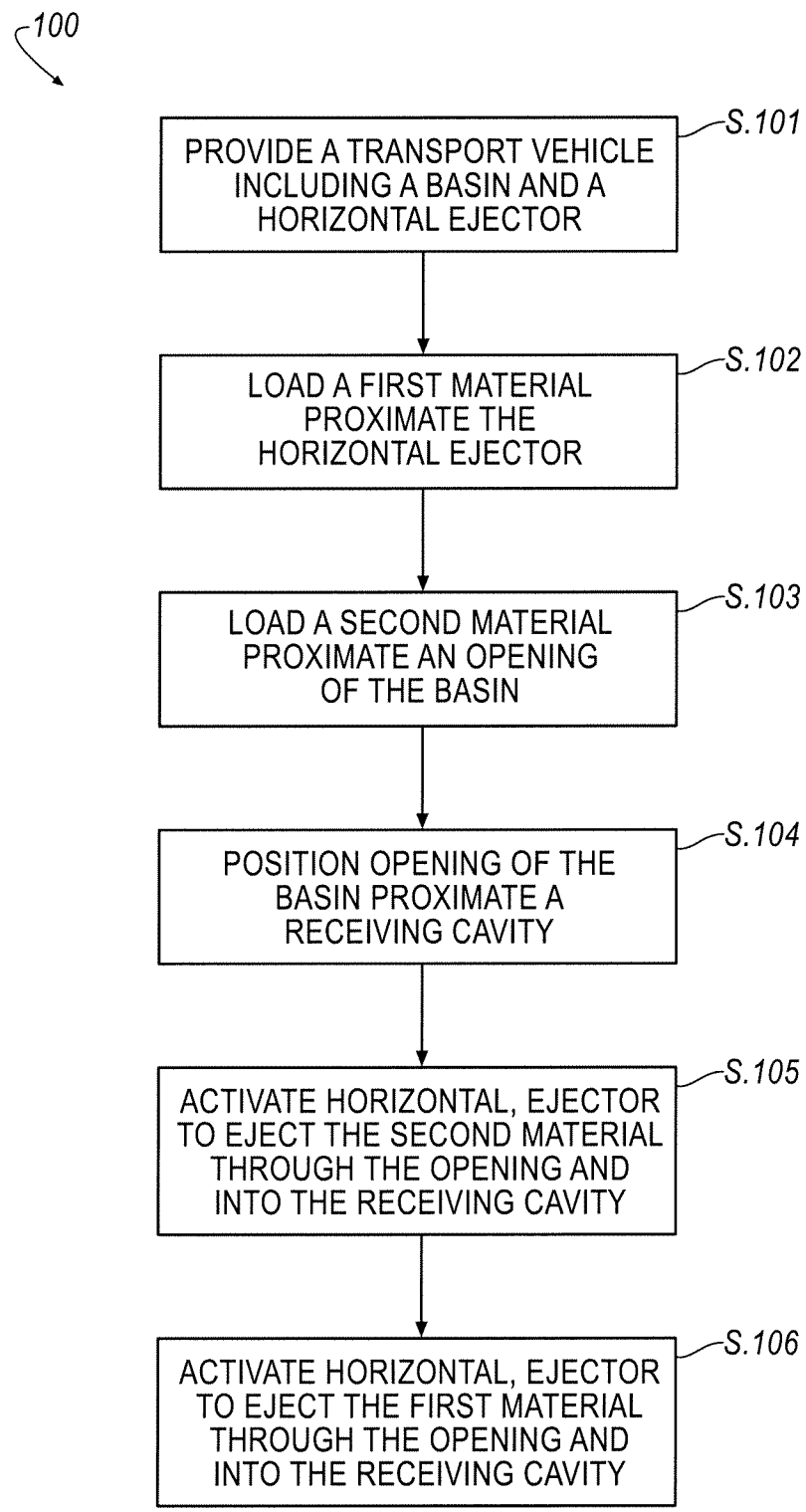
FIG. 2 illustrates a flow chart of a method for preparing a recyclable material in accordance with an exemplary embodiment of the invention.

Referring to FIGS. 1A-2, a method, system, and process for preparing a recyclable material, M, is shown according to an embodiment. In general, the recyclable material, M, is composed of a metal or a metallic-based material. The recyclable metal or metallic-based material, M, may be further defined to generally include a first, high density recyclable material, $M_H$, and a second, low density recyclable material, $M_L$.

According to an embodiment, the term "density" is defined to mean the mass of a substance per unit volume. According to an embodiment, $M_H$ and $M_L$ may have other attributes that differ such as packability. The packability of each material, $M_L$, $M_H$, is shown, for example, in FIG. 4. As such, the higher the packability, as related to, for example, the material, $M_H$, the less empty volume or space is available about the material, $M_H$, per unit volume, whereas, the lower the packability, as related to, for example, the material, $M_L$, the more empty volume or space is available about the material, $M_L$, per unit volume. It is understood that packability of material is not solely a function of the material's density and other factors such as geometry of particles, moisture content, etc. can also play an influential roll.

The second recyclable material, $M_H$, may comprise, for example, a plurality of shredded, relatively lighter and smaller metallic particles than that of the first recyclable material, $M_L$, that is defined, for example, by a plurality of shredded, relatively heavier and larger metallic particles. Although the present invention is described in relation to a recyclable metal or metallic-based material, M, it will be appreciated that the invention is not limited to a recyclable metal or metallic-based material and that the invention may be practiced with any desirable recyclable or non-recyclable material, such as, for example, plastic, paper, natural waste/compost, refuse, or the like.

As seen in FIG. 1A, the lighter, low density recyclable metal, $M_L$, and the heavier, high density recyclable metal, $M_H$, is shown loosely colleted in an environment, such as, for example, a scrap yard Y. The scrap yard, Y, may include a means for manipulating the material, M, such as, for example, heavy machinery or equipment, E, including, for example, a combination of a crane and an electromagnet. Alternatively, the heavy equipment machinery, E, may include, for example, a bulldozer (not shown) or the like.

A transport vehicle 10, such as, for example, a truck may be positioned proximate the recyclable material, M, such that the equipment, E, may then be activated to manipulate (i.e., grip, move, and release) the recyclable material, M, into a means for retaining the material, M, such as, for example, a bed, storage area, or basin 12 of the transport vehicle 10. In conjunction with step, S.101, of the method 100 of FIG. 2, the transport vehicle 10 is provided with the basin 12 in such a manner that the basin 12 is generally defined by a cavity 14 that includes a first end 16a and a second end 16b.

The first end 16a may include, for example, a gate that, when moved from a closed position to an opened position, defines an opening 18 formed in the basin 12. The second end 16b may include, for example, a means for horizontally ejecting the material, M, which may include, for example, an horizontal ejector assembly 20 (including ram head 20' and working cylinder 20") that is described in greater detail below. If desired, the transport vehicle 10 may not include a gate, but rather, an opening 18 that is defined at least in part by the basin 12.

According to one aspect of the invention as shown in FIGS. 1B and 2, the heavier, high density recyclable metal, $M_H$, is loaded (step, S.102) proximate the second end 16b near the horizontal ejector head 20'. Once the heavier, high density recyclable metal, $M_H$, is loaded proximate the second end 16b, the lighter, low density recyclable metal, $M_L$, is loaded (step, S.103) into the cavity 14 proximate the first end 16a near the gate 18 or opening. Then, at step, S.104, the transport vehicle 10 is positioned proximate a means for receiving the material, M, from the transport vehicle 10, such as, for example, a receiving cavity, R, such that the gate 18 or opening of the cavity 14 is near the receiving cavity, R.

In operation, as shown in FIG. 1C and at steps, S.105, S.106, the horizontal ejector 20 evacuates the recyclable material, M, into the receiving cavity, R, by moving the horizontal ejector 20 from a first, retracted position (FIG. 1B) proximate the second end 16b toward a deployed position (FIG. 1C) proximate the first end 16a. Preferably, the movement of the horizontal ejector head 20' from the retracted position to the deployed position is in a general horizontal motion or direction, as defined by arrow, H, along a floor or bottom surface 22 of the cavity 14. Preferably, evacuating the recyclable material does not involve lifting the basin. Evacuating the basin by lifting the basin (i.e. the method used by conventional dump trucks) can cause the ordering of $M_H$ and $M_L$ to shift during the dumping process, and accordingly, adversely influencing the benefits of the disclosed methods.

As such, the general vertical orientation of the basin 12 relative the receiving cavity, R, remains the same (e.g. no vertical elevation) during a material evacuation operation as the horizontal ejector 20 moves from the second end 16b to the first end 16a within the basin 12 so as to push out the recyclable material, M, in a rearward fashion (relative a forward, driving direction, F, of the transport vehicle 10) through the opening defined by, for example, the gate 18. Although evacuation of the recyclable material, M, from the cavity 14 is provided by way of the horizontal ejector 20', the invention is not limited to the utilization of an horizontal ejector 20'; for example, the bottom surface (i.e. floor) 22 of the cavity 14 may include, in an embodiment, a conveyor-belt-type device that horizontally moves the recyclable material, M, in the horizontal direction according to the arrow, H.

Figure 3A:
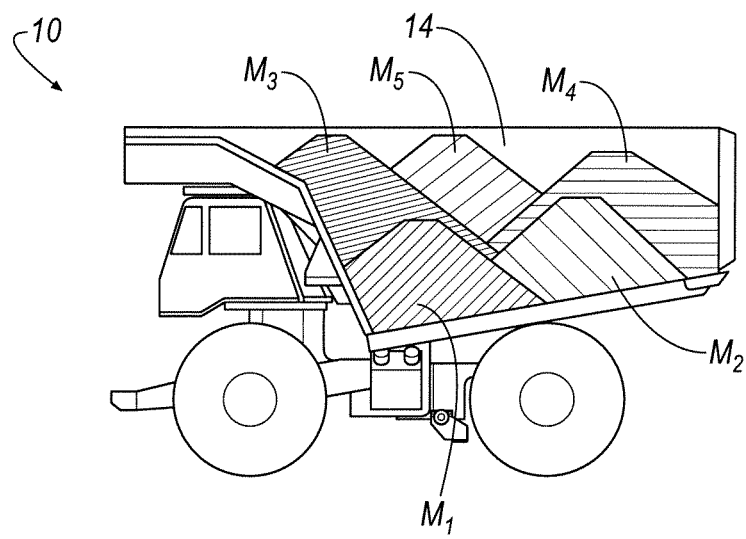
FIGS. 3A-3C illustrate alternative embodiments for loading a recyclable material into a cavity of a transport vehicle.
Figure 3B:
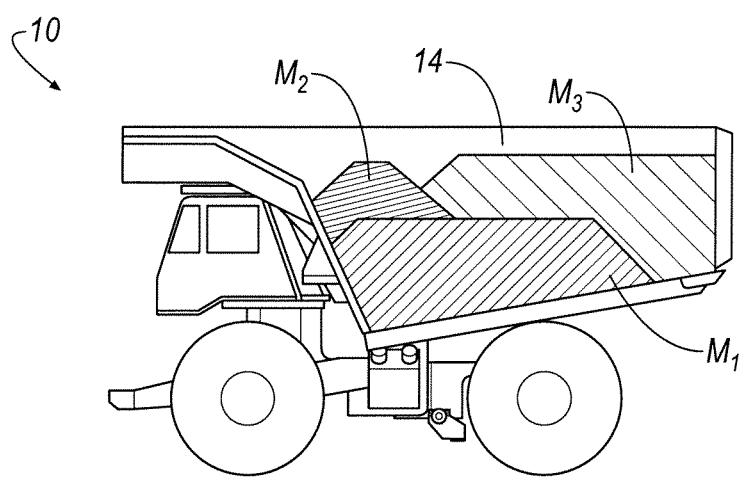
Figure 3C:
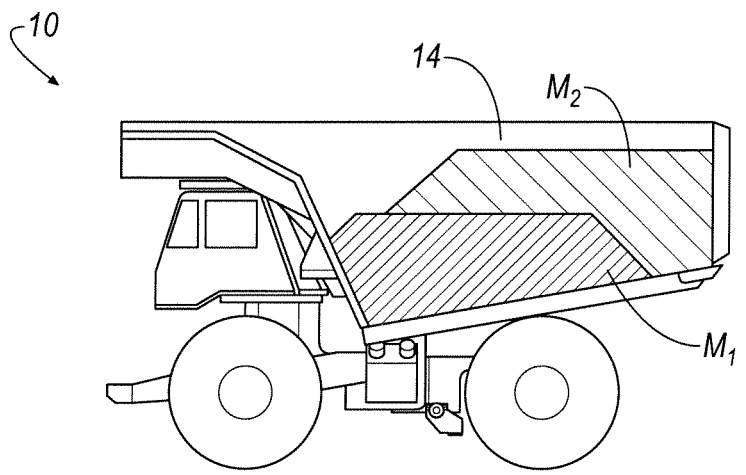

Although FIGS. 1A-2 are directed to an embodiment including a first recyclable material, $M_H$, and a second recyclable material, $M_L$, it will be appreciated that the invention is not limited to providing first and second recyclable materials, $M_H$, $M_L$, into the cavity 14 of the transport vehicle 10. As illustrated in FIGS. 3A-3C, it will be appreciated that two or more types of recyclable materials may be loaded or otherwise stacked or layered within a cavity 14 of the transport vehicle 10.

According to an embodiment, the recyclable metallic materials, $M_H$, $M_L$, may include any desirable scrap steel defined by a particular grade specification. Grade specifications may include, but is not limited to: Blend Scrap, Busheling, Bundles, Shredded Steel Scrap, Cut Plate & Structural, No. 1 Dealer Heavy Melt, High Dense Scrap, Railroad Specialty Scrap, Railroad Rail, Turnings, Mixed Turnings, Pig Iron, Direct Reduced Iron (DRI), Hot Briquetted Iron (HBI), Clean Auto Cast, Briquettes, Other Cast Products, Municipal Solid Waste Scrap, Steelmaking Pit Scrap, Crops, Frag, Ingot, Revert, Skull, and the like. Because the above grade-specifications are terms of art, they are further generally understood to encompass the examples set forth immediately below.

A. Blend Scrap. Blend scrap is generally calculated to yield not less than 0.89%. No. #2 bundles or steel can bundles. Blend scrap is also further defined to include no non-ferrous or non-magnetic materials. The maximum geometry of Blend Scrap include a 3' diagonal measurement.

B. Busheling. A first kind of Busheling may include "Industrial Busheling—No. 1 Industrial Busheling and Clips," which is defined by clean, prompt industrial steel scrap free from coatings. The maximum size is 5' by 2'. The materials originate from, are loaded, and shipped from an identified industrial plant. Minimum bulk density is 50 lbs/ cubic feet. A second kind of Busheling may include "No. 1 Dealer Busheling and Clips," which is substantially the same as Busheling except that the material need not be loaded and shipped from a known industrial plant. A third kind of Busheling may include "Galvanized No. 1 Industrial Busheling and clips," which is substantially the same as Industrial Busheling except that material may contain up to 1% galvanize coating by weight. A fourth kind of Busheling may include "Galvanized No. 1 Dealer Busheling and clips," which is substantially the same as Dealer Busheling except that material may contain up to 1% galvanize coating by weight. A fifth kind of Busheling may include "No. 2 Dealer Busheling," which may include any Busheling not meeting #1 Industrial or #1 Dealer Busheling specifications.

C. Bundles. A first kind of Bundles may include "No. 1 Industrial Bundle," which is defined by compressed Busheling scrap not exceeding 24"×24"×36". All material contained within the bundle should satisfy the chemistry requirements of No. 1 Industrial Busheling. The minimum bulk density is 75 lbs/cubic foot. Mandrel or bundle should be produced, loaded, and shipped from an identified industrial plant. A second kind of Bundle may include "No. 1 Dealer Bundle," which is substantially the same as No. 1 Industrial Bundle except that the material need not be loaded and shipped from an industrial plant. A third kind of Bundle may include "No. 1 Industrial Galvanized Bundle," which is substantially the same as No. 1 Industrial Bundle except that the material may have a galvanized coating, not exceeding 1% of the bundle weight. A fourth kind of Bundle may include "No. 1 Dealer Galvanized Bundle," which is substantially the same as No. 1 Dealer Bundle except that the material may have a galvanized coating, not exceeding 1% of the bundle weight. A fifth kind of Bundle may include "No 2 . Dealer Bundle," which may be defined by any Dealer Bundle not meeting the No. 1 Industrial or #1 Dealer Bundle specifications and generally should have steel approval before using this grade of scrap.

D. Shredded Steel Scrap. Shredded Steel Scrap is defined to be free of dirt and non-ferrous material. Shredded Steel Scrap is also further defined to not include engine blocks or engine parts, machinery, cast, municipal waste or can stock. The minimum bulk density is 60 lbs/cubic foot.

E. Cut Plate and Structural. Cut Plate and Structural Scrap is defined by cut structural and plate scrap having a maximum dimension of 48"×18"×¼" minimum thickness. The minimum bulk density is 75 lbs/cubic foot.

F. No. 1 Dealer Heavy Melt. No. 1 Dealer Heavy Melt 5'×2' is defined by clean steel scrap ¼" and over in thickness and not exceeding 5'×2'. No. 1 Dealer Heavy Melt may not include cast iron, sealed cylinders, electric motors, motor blocks, or die blocks.

G. No. 1 Dealer Heavy Melt 36"×18". No. 1 Dealer Heavy Melt 36"×18" may include clean steel scrap ¼" and over in thickness and not exceed 36"×18." In addition, No. 1 Dealer Heavy Melt 36"×18" may not include mill scale, pit scrap, cast iron, sealed cylinders, electric motors, motor blocks, or die blocks.

H. High Dense Scrap. High Dense Scrap may be defined by alloy free scrap not exceeding 36"×18" in any dimension. High Dense Scrap may include a portion of automotive scrap excluding motor blocks, electric motors, alternators, transmissions, electrical wiring, non-ferrous material and cast iron. Included in the mixture may be a significant portion of cut structural and plate, and may include any material that qualifies as #1 Dealer Busheling and clips. The minimum bulk density is 50 lbs./cubic foot.

I. Railroad Specialty Scrap. Railroad Specialty Scrap may be defined by railroad spikes, track bolts and nuts, tie plates, rail joints, angle and/or splice bars. The minimum bulk density is 70 lbs/cubic foot.

J. Railroad Rail. Railroad Rail is defined to include cropped rail, and standard section. The minimum density is 70 lbs/cubic foot. The maximum length is not to exceed 4'.

K. Turnings. Turnings is defined to include loose steel turnings free of non-ferrous contaminants such as copper, brass, lead, tin, aluminum, and the like. Turnings is also defined by a minimum amount of cutting fluid or oil content.

L. Mixed Turnings. Mixed Turnings is defined by a mixed analysis of loose steel turnings free of non-ferrous contaminants. Mixed Turnings is also defined by a minimum amount of cutting fluid or oil content.

M. Pig Iron. Pig Iron is defined to include cast iron pieces produced in an iron foundry or blast furnace operation. The size of Pig Iron is not to exceed 2'×8'×8".

N. Direct Reduced Iron (DRI). DRI is defined to include small iron pellets that are palletized from direct reduced iron fines, which are stabilized.

O. Hot Briquetted Iron (HBI). Hot Briquetted Iron is defined to include iron fines or stabilized pellets. The dimensions of DRI is not to exceed ¾"×1½"×4".

P. Clean Auto Cast. Clean Auto Cast is defined to include clean auto blocks free of all steel parts except camshafts, valves, valve springs, studs, and a minimum of oil residue.

Q. Briquettes. Briquettes is defined to include mechanically compacted briquettes with a 6" maximum geometry in any direction. Briquettes are to be free of any organic, non-ferrous, or oxide binders. Strength of the briquette should be sufficient such that briquettes do not break during dumping or normal handling by magnet.

R. Other Cast Products. Other Cast Products may be defined by scrap products including beach iron, cast iron run out, flat iron, tramp iron, and cast iron nuggets. These products are generally byproducts of iron foundry operations. Size of Other Cast Products is not to exceed 3'×2'×1' in any direction.

S. Municipal Solid Waste Scrap. Municipal Solid Waste Scrap is defined by scrap that has been magnetically separated from residential and commercial waste that has been incinerated and processed through shredders at a municipal waste facility.

T. Steelmaking Pit Scrap. Steelmaking Pit Scrap is defined to include irregular shaped nuggets of steel with a maximum dimension in any direction of 3' or less, which has been separated from steelmaking slag by crushing and magnetic separation.

U. Crops. Crops may include, for example, a waste product generated at a mill that is defined by trimmed portions of cast steel slabs or steel ingots. Crops may be defined by other terms of art, such as, for example, "crop ends."

V. Frag. Frag may include, for example, a waste product generated at a scrap yard or mill defined by small quantities of miscellaneous low grade steel products.

W. Ingot. Ingot may include, for example, cast steel blocks that are slow-cooled in soaking pits before being rolled or drawn into a finished product.

X. Revert. Revert may be defined by a scrap waste product generated by finishing lines at s mill. Revert scrap may include, for example, coil ends, coil pieces, damaged coils, bars, and the like.

Y. Skull. Skull may be defined by a high steel content residue of scrap material from an electrode arc furnace (EAF) or basic oxygen furnace (BOF).

Referring to FIG. 3A, five types of recyclable materials $M_1$-$M_5$ are provided into the cavity 14 of the transport vehicle 10. According to an embodiment, the material, $M_1$, may include approximately 15.0 tons of metal crops. According to an embodiment, the material, $M_2$, may include approximately 7.6 tons of metal pit and skull. According to an embodiment, the material, $M_3$, may include approximately 10.0 tons of high density scrap metal. According to an embodiment, the material, $M_4$, may include approximately 16.0 tons of metal frag. According to an embodiment, the material, $M_5$, may include approximately 15.5 tons of ingots.

Referring to FIG. 3B, three types of recyclable materials $M_1$-$M_3$ are provided into the cavity 14 of the transport vehicle 10. According to an embodiment, the material, $M_1$, may include approximately 12.0 tons of metal bundles. According to an embodiment, the material, $M_2$, may include approximately 10.0 tons of high density metal. According to an embodiment, the material, $M_3$, may include approximately 32.5 tons of metal crops. In an alternative embodiment, the three recyclable materials, $M_1$-$M_3$, may include, respectively, approximately 15.6 tons of high density metal, 5.1 tons of metal bundles, and 22.8 tons of metal revert.

Referring to FIG. 3C, two types of recyclable materials $M_1$, $M_2$ are provided into the cavity 14 of the transport vehicle 10. According to an embodiment, the material, $M_1$, may include approximately 16.3 tons of frag. According to an embodiment, the material, $M_2$, may include approximately 14.4 tons of high density metal.

Figure 4:
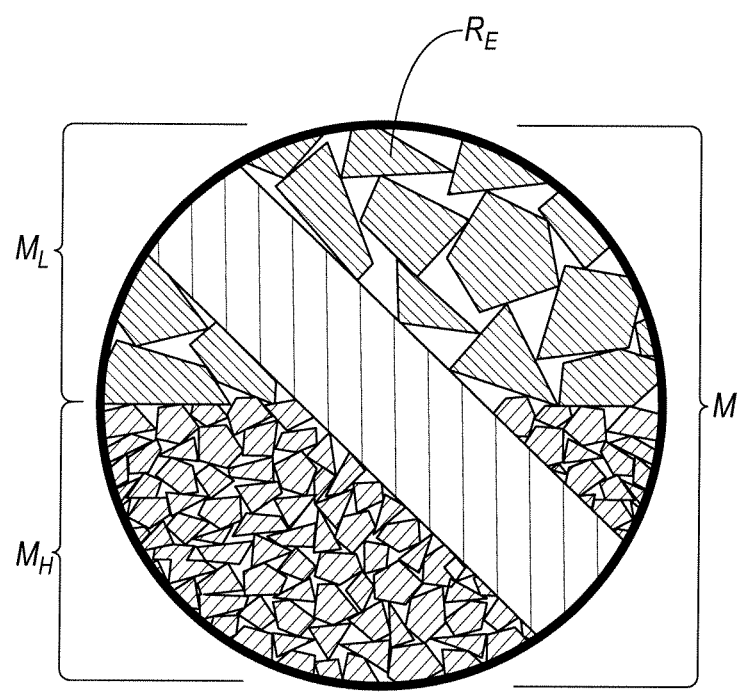
FIG. 4 illustrates a magnified view of recyclable material that is loaded into a receiving cavity that includes an electrode.

Irrespective of the amount of different types of material, M, provided into the cavity 14 of the transport vehicle 10, it will be appreciated that an organized ordering of material, M, in the cavity 14 provides several benefits when the placed, layered, or stacked ordering of the material, M, is moved from the transport vehicle 10 into the receiving cavity, R. If, for example, the receiving cavity, R, is an electric arc furnace (EAF) that includes an EAF electrode, $R_E$ (FIGS. 1B and 1C), an increased amount of contact of the material, M, with the EAF electrode, $R_E$, may improve material melt and flow during a subsequent recycling process. Accordingly, as illustrated in FIG. 4, for example, because the second material, $M_H$, is defined to include a high packability, the second material, $M_H$, provides an increased contact area with the EAF electrode, $R_E$, and therefore, increased current flow through the second material $M_H$, which improves melt and flow of the second materials $M_H$. Thus, as a result, the time it would take to melt the material, M, is reduced, and, correspondingly, the amount of time that current is provided to the EAF electrode, $R_E$, is also reduced.

In addition, the ordering of low density recyclable metal, $M_L$, proximate the first end 16a of the transport vehicle 10, provides a beneficial function by providing a cushioning effect over the bottom surface, $R_B$ (FIGS. 1B and 1C), of the receiving cavity, R, when another layer of recyclable material, such as, for example, the heavier, high density recyclable metal, $M_H$, is transferred into the cavity 14. As a result, because the lighter, high volume, low density recyclable metal, $M_L$, is first moved into the receiving cavity, R, at step, S.105, subsequent movement of the heavier, high density recyclable metal, $M_H$, into the receiving cavity, R, at step, S.106, reduces the likelihood that the heavier, low volume, high density recyclable metal, $M_H$, may damage the bottom surface, $R_B$, of the receiving cavity, R. If, for example, the receiving cavity, R, is a an EAF charging basin including a bottom surface, $R_B$, lined with refractory tiles composed of, for example, a ceramic or clay material, the heavier, high density recyclable metal, $M_H$, is less likely to damage the refractory tiles due to the cushioning effect provided by the pre-disposition of the lighter, low density recyclable metal, $M_L$, over the bottom surface, $R_B$, of the receiving cavity, R. Thus, according to an embodiment, the lighter, low density recyclable metal, $M_L$, provides a cushion means to prevent damage to the refractory tiles of an EAF charging basin, R when a heavier, high density recyclable metal, $M_H$ is discharged thereafter.

In addition, by horizontally moving (as opposed to dumping by vertically elevating basin 12) the material, M, according to the direction of the arrow, H, greater accuracy is achieved in the placement and stacking of the materials M within receiving cavity R. Even further, the ordering of material, M, in the transport vehicle 10 improves environmental conditions by generating less metallic dust and noise in the atmosphere when the material, M, is horizontally ejected into the receiving cavity, R. Yet even further, the ordering of the material, M, in the transport vehicle 10 may permit a matching of a desired steel chemistry to be arrived at when the material, M, is melted into a final recycled product within the receiving cavity, R.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for preparing material, comprising the steps of:
    providing a transport vehicle including
        a horizontal ejector and
        a basin that at least partially defines a basin opening, wherein the horizontal ejector engages at least one of a first material and a second material disposed in the basin;
    loading the first material into the basin proximate the horizontal ejector;
    loading the second material into the basin proximate the basin opening; and
    without changing a vertical orientation of the basin, evacuatin both of the first material and the second material from the basin by
        actuating the horizontal ejector for causing horizontal stroke movement of the horizontal ejector from a retracted position toward a deployed position for horizontally ejecting at least a portion the second material through the basin opening before any of the first material is ejected in response to the horizontal stroke movement of the horizontal elector and then subsequently
        horizontally ejecting the first material through the basin opening in response to the horizontal stroke movement of the horizontal ejector.

2. The method according to claim 1, wherein the first and second materials are recyclable materials.

3. The method according to claim 2, wherein the first and second materials include a metal or metallic-based material.

4. The method according to claim 2, wherein the first material has a higher density than the second material.

5. A method for transferring recyclable material, comprising the steps of:
    providing a cavity for receiving material, wherein the cavity is defined by a bed of a rear-eject, horizontal discharge vehicle including a ram disposed in the cavity, wherein the cavity includes an opening for ejecting said material;
    providing the material into said cavity, wherein the material includes
        metal shred that is provided proximate said opening, and
        metal scrap provided proximate said metal shred and away from said opening;
    horizontally and rearwardly ejecting said material into a receiving basin without changing a vertical position of said cavity; and
    providing a cushioning-effect for said metal scrap proximate a bottom surface of said receiving basin, wherein said cushioning-effect is provided by said metal shred that is first ejected through said opening by said ram prior to the ejection of said metal scrap by said ram.

6. The method according to claim 5, wherein said receiving basin is an electric arc furnace.

7. The method according to claim 6, wherein said bottom surface of said receiving basin includes refractory tiles.

\* \* \* \* \*